(12) United States Patent
Butler et al.

(10) Patent No.: US 6,666,018 B2
(45) Date of Patent: Dec. 23, 2003

(54) COMBINED CYCLE PULSE DETONATION TURBINE ENGINE

(75) Inventors: Lawrence Butler, Cincinnati, OH (US); James Edward Johnson, Hamilton, OH (US); Lawrence Wayne Dunbar, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/328,679

(22) Filed: Dec. 23, 2002

(65) Prior Publication Data

US 2003/0131584 A1 Jul. 17, 2003

Related U.S. Application Data

(60) Continuation-in-part of application No. 10/074,072, filed on Feb. 12, 2002, now Pat. No. 6,550,235, which is a division of application No. 09/540,566, filed on Mar. 31, 2000, now Pat. No. 6,442,930.

(51) Int. Cl.$^7$ .............................. F02K 3/06; F02K 7/02
(52) U.S. Cl. ........................................ 60/226.1; 60/247
(58) Field of Search ............................ 60/226.1, 226.3, 60/247, 249, 761, 762

(56) References Cited

U.S. PATENT DOCUMENTS

| | | | |
|---|---|---|---|
| 2,635,420 A | * 4/1953 | Jonker | 60/226.1 |
| 5,353,588 A | * 10/1994 | Richard | 60/247 |
| 5,513,489 A | 5/1996 | Bussing | |
| 5,694,768 A | 12/1997 | Johnson et al. | |
| 5,873,240 A | 2/1999 | Bussing et al. | |
| 5,937,635 A | 8/1999 | Winfree et al. | |
| 6,349,538 B1 | 2/2002 | Hunter, Jr. et al. | |
| 6,439,503 B1 | 8/2002 | Winfree et al. | |
| 6,477,829 B1 | 11/2002 | Hunter et al. | |
| 6,505,462 B2 | 1/2003 | Meholic | |
| 6,516,605 B1 | 2/2003 | Meholic | |

FOREIGN PATENT DOCUMENTS

| | | |
|---|---|---|
| DE | 2046079 | 9/1970 |
| WO | 8706976 | 5/1987 |

OTHER PUBLICATIONS

Baker et al., "Pulse Detonation Bypass Engine Propulsion Pod", US Patent Application Publication, Pub. No.: US 2002/0166318 A1, Pub. Date: Nov. 14, 2002.

Baker, "Propulsion Module", US Patent Application Publication, Pub. No.: US 2003/0029162 A1, Pub. Date: Feb. 13, 2003.

Hunter, Jr., "Mapp Gas Fuel For Flight Vehicles Having Pulse Detontion Engines And Method Of Use", US Patent Application Publication, Pub. No.: US 2003/0029161 A1, Pub. Date: Feb. 13, 2003.

European Search Report, Application No. EP 01 30 3058, Place of Search "Munich", Jul. 26, 2001, Examiner P. Acton, pp. 14–15.

* cited by examiner

*Primary Examiner*—Louis J. Casaregola
(74) *Attorney, Agent, or Firm*—Penny A. Clarke; Patrick K. Patnode

(57) ABSTRACT

A pulse detonation system for a turbofan engine including a fan assembly and a turbine sub-system, which includes at least one turbine, is configured to create a temperature rise and a pressure rise within the turbofan engine and to generate thrust for the turbofan engine. The pulse detonation system includes a pulse detonation core assembly comprising at least one detonation chamber configured to detonate a fuel mixture. The pulse detonation core assembly is positioned between the fan assembly and the turbine sub-system.

10 Claims, 5 Drawing Sheets

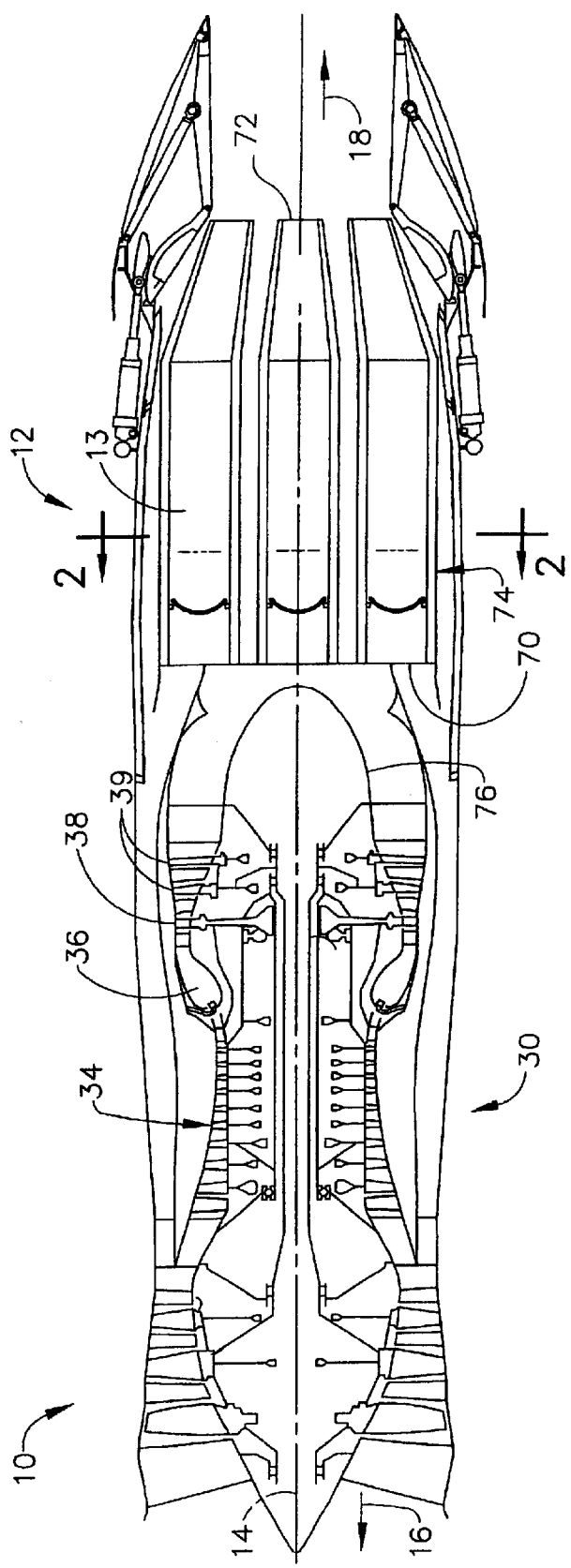
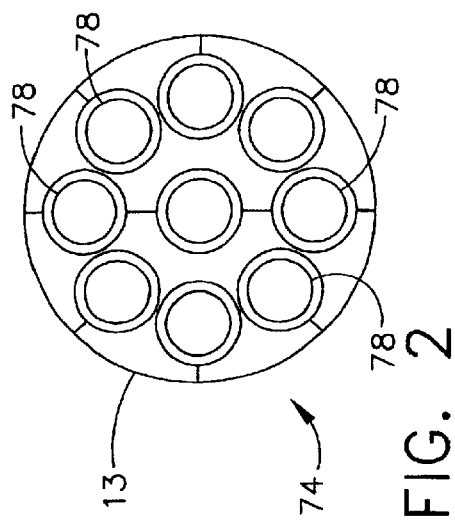
FIG. 1
FIG. 2

COMBINED CYCLE PULSE DETONATION TURBINE ENGINE

This is a continuation in part of application Ser. No. 10/074,072, filed Feb. 12, 2002 now U.S. Pat. No. 6,550,235, which is a divisional application of U.S. Pat. No. 6,442,930 corresponding to Ser. No. 09/540,566 and filed on Mar. 31, 2000, which are hereby incorporated by reference.

BACKGROUND OF THE INVENTION

This invention relates to gas turbine engines, and more particularly, to a pulse detonation system for a turbofan engine.

Variable cycle turbofan ramjet engines may be used to provide aircraft flight speeds between low subsonic Mach numbers to high supersonic Mach numbers of about Mach 6. Known engines, as described in U.S. Pat. No. 5,694,768, include a core engine system and a dual mode augmentor. The dual mode augmentor provides additional heat to exhaust airflow exiting the core engine system to increase engine thrust. The core engine system provides power to drive a fan assembly and typically includes in serial, axial flow relationship, a compressor, a combustor, a high pressure turbine, and a low pressure turbine. The dual mode augmentor is positioned downstream from the core engine and receives air from the core engine and a bypass duct surrounding the core engine.

Known engines can operate over a wide range of flight speed operations if several different combustion systems are utilized. During flight speed operations from takeoff to approximately Mach 3, the core engine and an engine fan system provide airflow at a pressure and quantity used by the augmentor to produce thrust for the engine. To maintain flight speed operations between Mach 3 and Mach 6, the core engine system is shut-down and ram air flow is introduced into the dual mode augmentor either by windmilling the fan system or by utilizing an auxiliary ram duct. To sustain flight speed operations above Mach 6, either a separate supersonic combustion system, i.e., a scramjet, is used, or a separate rocket-based thrust producing system is used. To achieve flight speed operations in space, the rocket-based thrust producing system is used. As a result, for an engine to operate efficiently over a wide range of operating flight speeds, several different combustion systems are used.

BRIEF SUMMARY OF THE INVENTION

In an exemplary embodiment, a pulse detonation system for a turbofan engine is disclosed. The turbofan engine includes a fan assembly and a turbine sub-system. The turbine sub-system includes at least one turbine. The pulse detonation system is configured to create a temperature rise and a pressure rise within the turbofan engine and to generate thrust for the turbofan engine. The pulse detonation system includes a pulse detonation core replacement assembly comprising at least one detonation chamber configured to detonate a fuel mixture. The pulse detonation core replacement assembly is positioned between the fan assembly and the turbine sub-system.

A turbofan engine embodiment is also disclosed. The turbofan engine includes a fan assembly, at least one turbine downstream from the fan assembly, an inlet portion upstream from the fan assembly, an exhaust portion positioned co-axially with the inlet portion, and a pulse detonation system positioned between the fan assembly and the turbine. The pulse detonation system is configured to create a temperature rise and a pressure rise to generate engine thrust for the turbofan engine. The pulse detonation system includes a pulse detonation core assembly comprising at least one detonation chamber configured to detonate a fuel mixture. The pulse detonation core assembly is positioned between the fan assembly and the turbine.

BRIEF DESCRIPTION OF THE DRAWINGS

FIG. 1 is a cross-sectional side view of a turbofan engine including a pulse detonation system;

FIG. 2 is a cross-sectional view of a pulse detonation augmentor used with the pulse detonation system shown in FIG. 1 taken along lines 2—2;

DETAILED DESCRIPTION OF THE INVENTION

Figure 3:
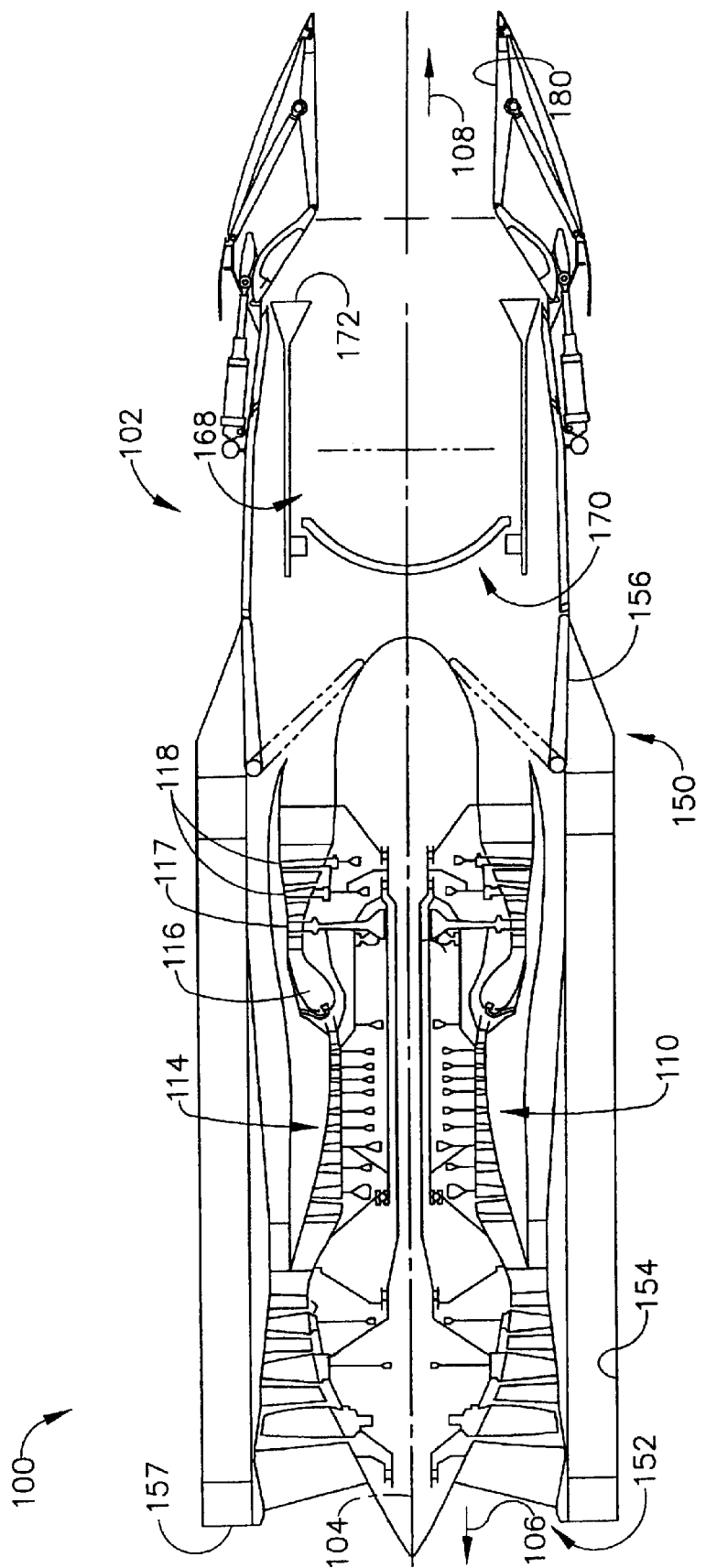
FIG. 3 is a cross-sectional side view of an alternative embodiment of a turbofan engine in a low flight speed mode of operation.

FIG. 1 is a cross-sectional side view of a turbofan engine 10 including a pulse detonation system 12. FIG. 2 is a cross sectional view of a pulse detonation augmentor 13 taken along lines 2—2 shown in FIG. 1. In one embodiment, turbofan engine 10 is an F110/129 engine available from General Electric Aircraft Engines, Cincinnati, Ohio. Engine 10 has a generally longitudinally extending axis or centerline 14 extending in a forward direction 16 and an aft direction 18. Engine 10 includes a core engine 30 which includes a high pressure compressor 34, a combustor 36, a high pressure turbine 38, and a power turbine or a low pressure turbine 39 all arranged in a serial, axial flow relationship. In alternative embodiments, engine 10 includes a core fan assembly (not shown).

Pulse detonation system 12 is disposed downstream from both core engine 30 and receives core engine combustion gases from core engine 30. Pulse detonation system 12 creates a temperature rise and a pressure rise within engine 10 without the use of turbomachinery included within core engine 30 to generate thrust from engine 10. Pulse detonation system 12 includes pulse detonation augmentor 13 which includes an inlet side 70, an outlet side 72, and a shock tube sub-system 74. Inlet side 70 is upstream from outlet side 72 and circumferentially surrounds an engine centerbody 76.

Shock tube sub-system 74 includes a plurality of shock tubes 78 extending between pulse detonation augmentor inlet side 70 and pulse detonation augmentor outlet side 72. Shock tubes 78 permit fuel and air entering pulse detonation system 12 to mix and detonate. Each shock tube 78 has a circular cross-sectional profile and shock tube subsystem 74 has a circular cross-sectional profile. In one embodiment, shock tube sub-system has a non-circular cross-sectional profile. As known to those skilled in the art, pulse detonation may be accomplished in a number of types of detonation chambers, including detonation tubes, resonating detonation cavities and annular detonation chambers. As used herein, the terms "shock tube" and detonation chamber are used interchangeably. Shock tubes 78 extend from core engine 30 to a converging-diverging exhaust nozzle 84. Exhaust nozzle 84 is disposed downstream from pulse detonation system 12 and shock tubes 78.

During operation, airflow enters engine 10 and fuel is introduced to core engine 30. The air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 39. The core airflow is discharged from low pressure turbine 39.

The combined airflow is channeled into pulse detonation system 12 and mixed with additional fuel introduced to engine 10. Pulse detonation system 12 detonates the mixture to create a temperature rise and a pressure rise within engine 10, thus generating thrust from engine 10. In one embodiment, system 12 is controlled with a very high speed valving system capable of operating at between 500 and 1000 cycles per second or higher and a spark or plasma ignition system. In another embodiment, system 12 is controlled with a continuous detonation valveless system that incorporates a pre-burning device. In yet another embodiment, system 12 utilizes a variable geometry mixer/injector to control off-design tailoring of outlet gases within shock tube sub-system 74. Alternatively, system 12 incorporates elements of the previous three embodiments for control.

As used herein, "detonating" refers both detonations and quasi-detonations. A "quasi-detonation" is a combustion process that produces a pressure rise and velocity increase higher than the pressure rise and velocity increase produced by a deflagration wave. In contrast, deflagrations result in a loss of pressure. The detonations or quasi-detonations are initiated either by external ignition, such as spark discharge or laser pulse, or by gas dynamic processes, such as shock focusing, autoignition or by another detonation (cross-fire).

FIG. 3 is a cross-sectional side view of an alternative embodiment of a turbofan engine 100 including a pulse detonation system 102 in a low flight speed mode of operation. Engine 100 has a generally longitudinally extending axis or centerline 104 extending in a forward direction 106 and an aft direction 108. Engine 100 includes a core engine 110 which includes a high pressure compressor 114, a combustor 116, a high pressure turbine 117, and a power turbine or a low pressure turbine 118 all arranged in a serial, axial flow relationship. In an alternative embodiment, engine 100 also includes a core engine including a core fan assembly.

An auxiliary ram duct and valving system 150 is disposed radially outward from core engine 110 and extends from an inlet side 152 of engine 100 to pulse detonation system 102. Auxiliary ram duct and valving system 150 includes an auxiliary ram duct 154 and a ram air valve 156. Ram duct 154 includes an inlet 157 for receiving air. Inlet 157 is annular and is in flow communication with ram duct 154. Ram air valve 156 is disposed within ram duct 154 and is selectable to control a flow of ram air through auxiliary ram duct and valving system 150. During low flight speed modes of operation, ram air valve 156 is closed to prevent ram air from flowing through ram duct 154 into engine 100. During moderate supersonic Mach number flight speed operations between Mach 3 and Mach 5, ram air valve 156 is open to permit ram air to flow through ram duct 154 into engine 100.

Ram air valve 156 is also positionable at intermediate positions to control an amount of airflow channeled into ram duct 154.

Pulse detonation system 102 is disposed downstream from core engine 110 and auxiliary ram duct and valving system 150. During operation, pulse detonation system 102 receives airflow from ram duct 154 and core engine combustion gases from core engine 110. Pulse detonation system 102 creates a temperature rise and a pressure rise within engine 100 without the use of turbomachinery to generate thrust from engine 100. Pulse detonation system 102 includes a pulse detonation augmentor 168, which includes an inlet side 170, an outlet side 172, and a shock tube sub-system 174. Inlet side 170 is upstream from outlet side 172 and circumferentially surrounds an engine centerbody 176. Shock tube sub-system 174 includes a plurality of shock tubes (not shown) extending between pulse detonation augmentor inlet side 170 and pulse detonation augmentor outlet side 172. Fuel and air are mixed and detonated within shock tube sub-system 174, which extends from core engine 110 to an exhaust nozzle 180.

During low flight speed operation, airflow enters engine 100 and fuel is introduced to core engine 110. Specifically, pressurized air from high pressure compressor 114 is mixed with fuel in combustor 116 and ignited, thereby generating combustion gases. Such combustion gases drive high pressure turbine 117 which drives high pressure compressor 116. The combustion gases are discharged from high pressure turbine 117 into low pressure turbine 118. The core airflow is discharged from low pressure turbine 118. The airflow is channeled into pulse detonation system 102 and mixed with additional fuel introduced to engine 100. Pulse detonation system 102 creates a temperature rise and a pressure rise within engine 100 to generate thrust from engine 100.

During moderate supersonic Mach number flight speed operations between Mach 3 and Mach 5, ram air valve 156 is placed in an open position to permit ram air to enter ram duct 154 and flow to pulse detonation system 102. Fuel is introduced to pulse detonation system 102 and is mixed with ram air exiting ram duct 154. The fuel/air mixture is ignited to produce combustion gases and thrust for engine 100.

Figure 4:
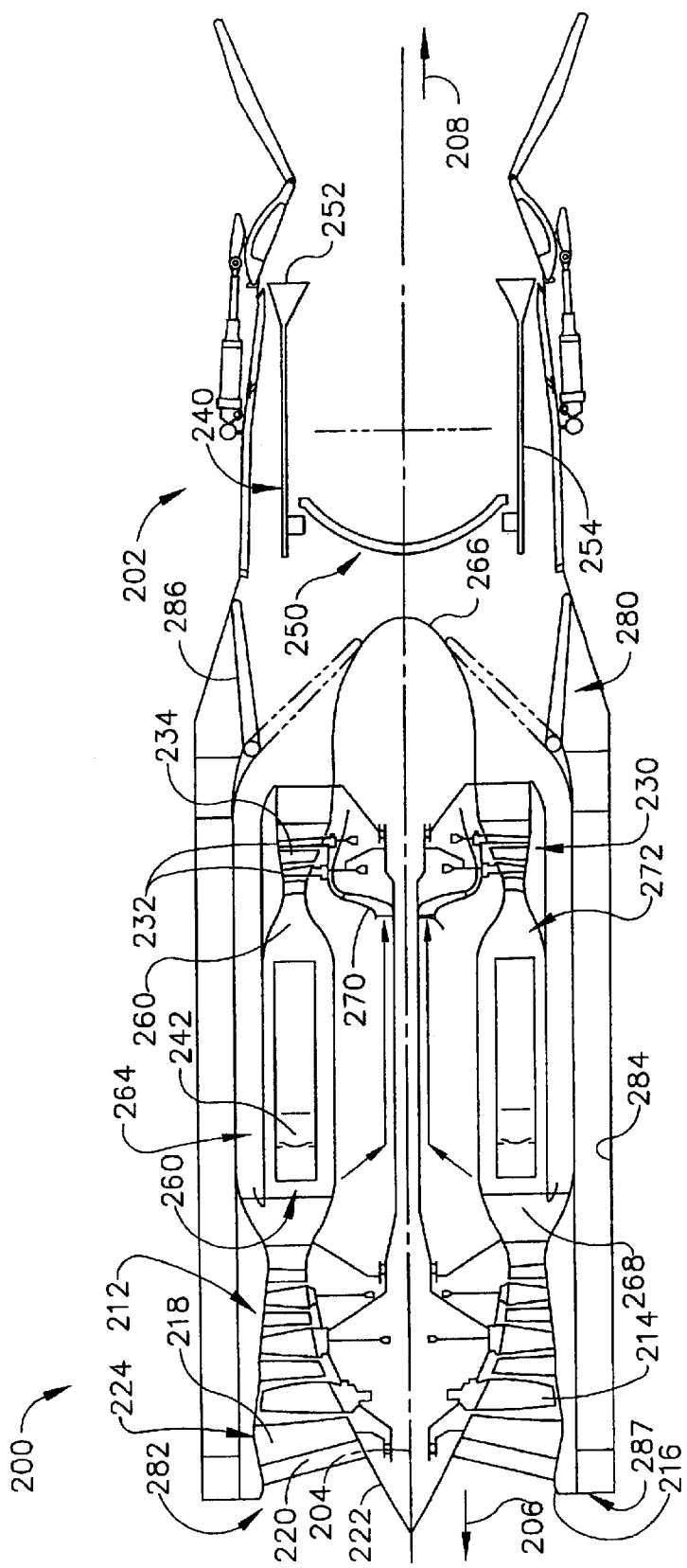
FIG. 4 is a cross-sectional view of another embodiment of a turbofan engine including a pulse detonation core replacement augmentor assembly used to replace a core engine shown in FIG. 1.

FIG. 4 is a cross-sectional view of another embodiment of a turbofan engine 200 including a pulse detonation system 202. Engine 200 has a generally longitudinally extending axis or centerline 204 extending in a forward direction 206 and an aft direction 208. Engine 200 includes a fan assembly 212, which includes a forward fan 214 disposed in an inlet duct 216 of engine 200. Fan 214 includes a plurality of blades 218 circumferentially spaced around engine centerline 204. Inlet guide vanes 220 are disposed in inlet duct 216 upstream from forward fan 214 and extend between an engine hub 222 and an engine casing 224. Engine 200 also includes a turbine sub-system 230 disposed in flow communication with forward fan 214. Turbine sub-system 230 includes a turbine 232 disposed in flow communication with forward fan 214 and including a plurality of blades 234 extending radially outward from engine centerline 204.

Pulse detonation system 202 creates a temperature rise and a pressure rise within engine 200 without the use of turbomachinery to generate thrust for engine 200. Pulse detonation system 202 includes a pulse detonation augmentor 240 and a pulse detonation core replacement augmentor assembly 242. Pulse detonation augmentor 240 includes an inlet side 250, an outlet side 252, and a shock tube sub-system 254. Inlet side 250 is upstream from outlet side 252 and circumferentially surrounds an engine centerbody 256.

Shock tube subsystem 254 includes a plurality of shock tubes (not shown) extending between pulse detonation augmentor inlet side 250 and pulse detonation augmentor outlet side 252. The shock tubes permit fuel and air entering pulse detonation system 202 to mix and detonate to provide thrust from engine 200.

Pulse detonation core replacement augmentor assembly 242 (or pulse detonation core assembly 242) includes an inlet side 260, an outlet side 262, and a shock tube sub-system 264. Inlet side 260 is upstream from outlet side 262 and circumferentially surrounds an engine centerbody 266. Inlet side 266 includes an annular inlet 268, which permits airflow to enter pulse detonation core replacement augmentor assembly 242. Shock tube sub-system 264 includes a plurality of shock tubes (not shown) extending between pulse detonation core replacement augmentor assembly inlet side 260 and pulse detonation core replacement augmentor assembly outlet side 262 and circumferentially disposed around engine centerline 204.

The shock tubes permit fuel and air entering pulse detonation system 202 to mix and detonate. The shock tubes also direct the hot combustion gases to pulse detonation augmentor 240. Pulse detonation core replacement augmentor assembly 242 replaces a core engine, such as core engine 110 (shown in FIG. 3) of engine 100 (shown in FIG. 3). By "replacing a core engine," it should be understood that pulse detonation core replacement assembly may replace either the high pressure turbine, compressor and combustor forming a core engine, or may replace only the combustor of a core engine.

Turbine sub-system 230 is disposed between pulse detonation augmentor 240 and pulse detonation core replacement augmentor assembly 242. Accordingly, turbine sub-system turbine 232 is in flow communication with pulse detonation augmentor 240 and pulse detonation core replacement augmentor assembly 242. A cooling air pump 270 is disposed radially inward from pulse detonation core replacement augmentor assembly 242 and provides cooling air to turbine sub-system 230. Cooling air pump 270 is disposed on a shaft (not shown), which connects turbine 232 with forward fan 214. Alternatively, cooling air pump 270 may be disposed radially outward from pulse detonation core replacement assembly 242.

Engine 200 also includes an ejector/mixer 272 disposed upstream from turbine sub-system turbine 232. Ejector/mixer 272 controls the mixture of hot high pressure gases exiting pulse detonation core replacement augmentor assembly 242 and flowing to turbine 232. Ejector/mixer 272 also controls an amount of cooling air flowing through pulse detonation core replacement augmentor assembly 242, thus permitting turbine 232 to operate efficiently from engine start-up operating conditions to engine full-power operating conditions. Beneficially, controlling the amount of high pressure gas exiting pulse detonation core replacement assembly 242 and flowing to turbine 232 facilitates augmenting the thrust generated by the turbofan. In one embodiment, engine 200 also incorporates a shock tube flow adjustment schedule (not shown) and an inlet flow/shock tube operating band schedule (not shown) to enable turbine 232 to function through a complete range of engine operating conditions.

An auxiliary ram duct and valving system 280 is disposed radially outward from pulse detonation system 202 and extends from an inlet side 282 of engine 200 to pulse detonation augmentor 240. Auxiliary ram duct and valving system 280 includes an auxiliary ram duct 284 and a ram air valve 286. Ram duct 284 surrounds inlet guide vanes 220, and forward fan 214, and includes an inlet 287 for receiving air upstream from inlet guide vanes 220. Inlet 287 is annular and is in flow communication with ram duct 284. Ram air valve 286 is disposed within ram duct 284 and is selectable to control a flow of ram air through auxiliary ram duct and valving system 280. During low flight speed modes of operation, ram air valve 286 is closed to prevent ram air from flowing through ram duct 284 into engine 200. During moderate supersonic Mach number flight speed operations between Mach 3 and Mach 5, ram air valve 286 is opened to permit ram air to flow through ram duct 284 into engine 200. Ram air valve 286 is also positionable at intermediate positions to control an amount of airflow channeled into ram duct 284.

Engine 200 also includes an oxidizer injection system (not shown in FIG. 4). The oxidizer injection system is upstream from first pulse detonation augmentor 240 and in flow communication with pulse detonation augmentor 240 and permits an oxidizer (not shown) to be introduced into engine 200 to enable engine 200 to operate in a rocket mode of operation for flight altitudes at the edge of space and beyond. In one embodiment, the oxidizer is liquid oxygen. Alternatively, the oxidizer is liquid air.

During powered fan modes of operation or low flight speed modes of operation, ram air valve 286 is closed to prevent airflow from entering ram duct 284 and instead airflow enters engine 200 and passes through forward fan 214. Airflow is discharged axially from forward fan 214 into pulse detonation core replacement augmentor assembly inlet 268. As air enters pulse detonation core replacement augmentor assembly 242, fuel is introduced into pulse detonation core replacement augmentor assembly 242. The pulse detonation core replacement augmentor assembly shock tubes combine the air and fuel and detonate the mixture, thus increasing the temperature and pressure of the flow through pulse detonation core replacement augmentor assembly 242.

During powered fan modes of operation, ejector/mixer 272 tailors the mixture of hot high pressure gases exiting pulse detonation core replacement augmentor assembly 242 and flowing to turbine 232. Ejector/mixer 272 also tailors an amount of cooling air flowing through pulse detonation core replacement augmentor assembly 242 to permit turbine 232 to operate within engine 200. Accordingly, during such powered fan modes of operation, a portion of the hot gases are directed through ejector/mixer 272 around turbine 232 to permit turbine 232 to operate from engine start-up operating conditions through engine full-power operating conditions. During such modes of operation, turbine 232 drives forward fan 214.

The hot gases are discharged from pulse detonation core replacement augmentor assembly 242 into pulse detonation augmentor 240. Additional fuel is introduced into pulse detonation augmentor 240, which mixes the hot gas mixture and the fuel and detonates the mixture. Detonating the mixture creates an additional temperature and pressure rise, resulting in thrust from engine 200. The powered fan mode of operation permits engine 200 to produce thrust for flight speed operations to about Mach 3.

Figure 5:
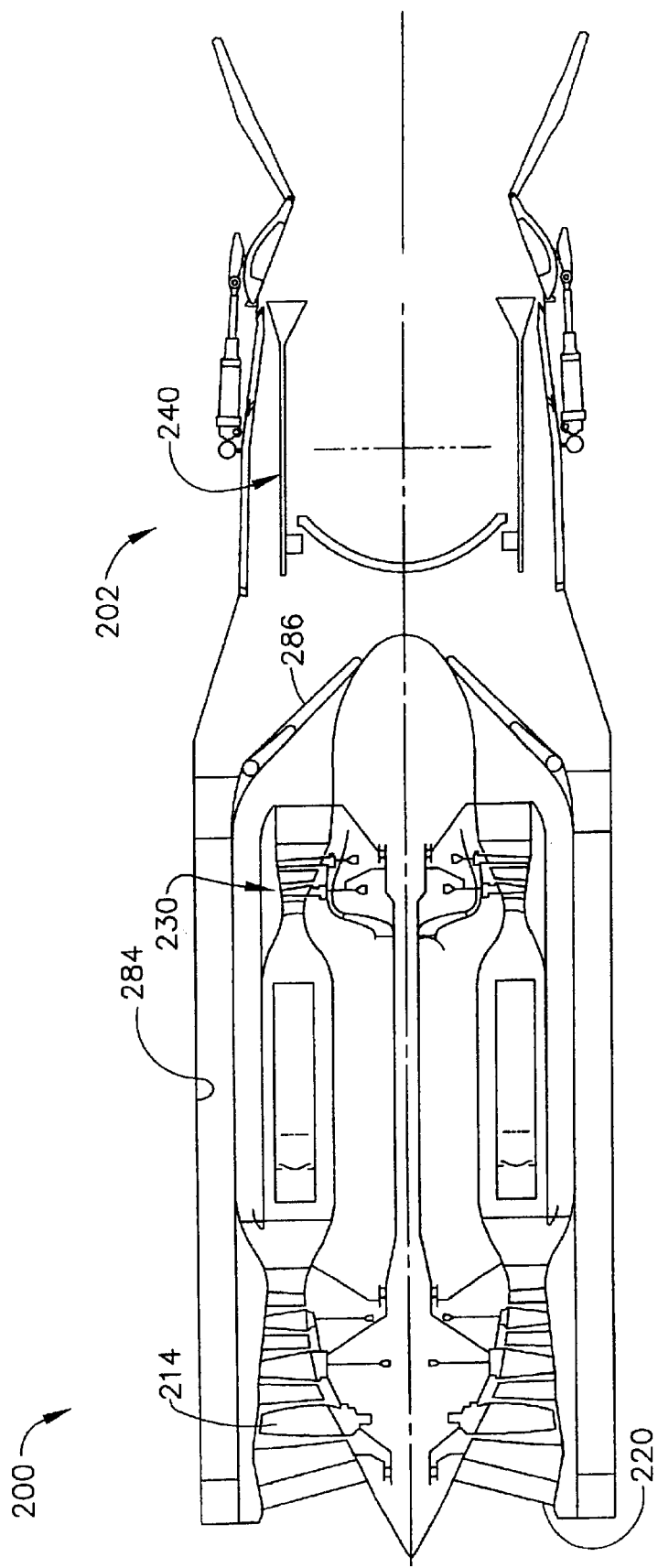
FIG. 5 is a cross-sectional view of the turbofan engine shown in FIG. 4 in a ram duct mode of operation.

FIG. 5 is a cross-sectional view of turbofan engine 200 in a ram duct mode of operation. The ram duct mode of operation permits engine 200 to operate with flight speeds between approximately Mach 3 and Mach 6. During the ram duct mode of operation, inlet guide vanes 220 are rotated to a closed position to substantially prevent airflow from entering forward fan 214 and to substantially cocoon forward fan 214 and turbine sub-system 230. Ram air valve 286 is rotated opened to permit ram air to enter ram duct 284 and flow to pulse detonation system 202. Fuel is introduced to pulse detonation system 202 within pulse detonation augmentor 240 and is mixed with ram air exiting ram duct 284. The fuel/air mixture is ignited to produce combustion gases and thrust for engine 200. An auxiliary heat exchanger (not shown) provides cool air to cool cocooned forward fan 214 and turbine subsystem 230.

Figure 6:
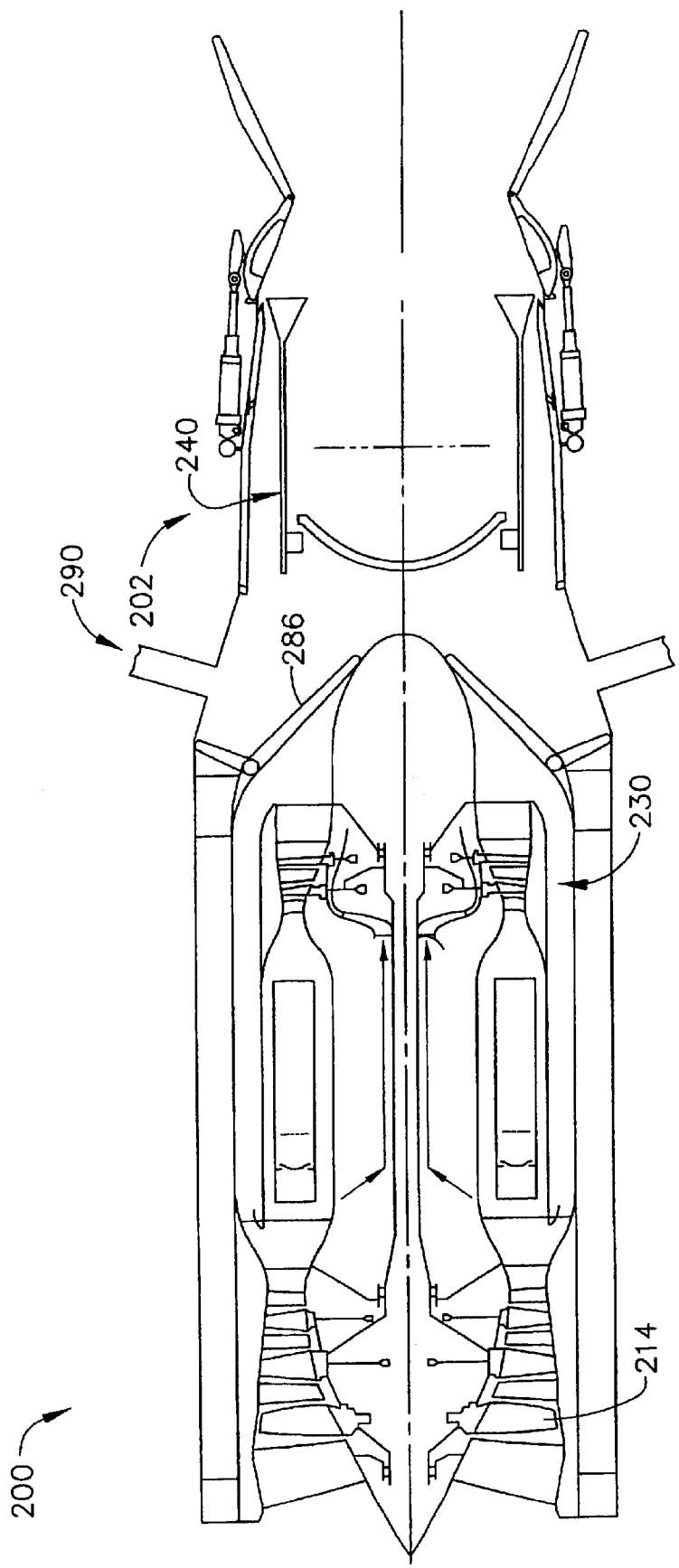
FIG. 6 is a cross-sectional view of the turbofan engine shown in FIG. 4 in a rocket mode of operation.

FIG. 6 is a cross-sectional view of turbofan engine 200 shown in a rocket mode of operation and including an oxidizer injection sub-system 290. The rocket mode of operation permits engine 200 to operate with flight altitudes at the edge of space and flight speeds greater than Mach 6. During the rocket mode of operation, inlet guide vanes 220 remain rotated in a closed position to substantially prevent airflow from entering forward fan 214 and turbine sub-system 230. Ram air valve 286 is rotated closed to prevent ram air from entering ram duct 284 and pulse detonation system 202. Oxidizer injection system 290 introduces an oxidizer (not shown) to pulse detonation system 202 and directs the oxidizer downstream towards pulse detonation augmentor 240. The oxidizer, combined with injected fuel, produces thrust from engine 200 and helps to cool engine 200 during operation.

The above-described pulse detonation system includes a pulse detonation core replacement assembly, which produces engine thrust. The pulse detonation system permits an engine to operate with a high efficiency and performance over a wide range of operating flight speeds.

While the invention has been described in terms of various specific embodiments, those skilled in the art will recognize that the invention can be practiced with modification within the spirit and scope of the claims.

What is claimed is:

1. A pulse detonation system for a turbofan engine including a fan assembly and a turbine sub-system, the turbine sub-system including at least one turbine, said pulse detonation system being configured to create a temperature rise and a pressure rise within the turbofan engine and to generate thrust for the turbofan engine, said pulse detonation system comprising a pulse detonation core assembly comprising at least one detonation chamber configured to detonate a fuel mixture, said pulse detonation core assembly being positioned between the fan assembly and the turbine sub-system.

2. The pulse detonation system of claim 1, wherein said pulse detonation core assembly is in flow communication with the turbine sub-system.

3. The pulse detonation system of claim 2 further comprising a cooling air pump configured to supply cooling air to said turbine sub-system, said cooling air pump being disposed radially inward from said pulse detonation core assembly.

4. The pulse detonation system of claim 2 further comprising an ejector/mixer positioned upstream from the turbine sub-system, said ejector/mixer being configured to control an amount of high pressure gas exiting said pulse detonation core assembly and flowing to the turbine.

5. The pulse detonation system of claim 1, wherein the fan assembly includes a forward fan in flow communication with the turbine.

6. A turbofan engine comprising:

a fan assembly;

at least one turbine downstream from said fan assembly;

an inlet portion upstream from said fan assembly;

an exhaust portion positioned co-axially with said inlet portion; and a pulse detonation system positioned between said fan assembly and said turbine, said pulse detonation system being configured to create a temperature rise and a pressure rise to generate engine thrust for said turbofan engine, said pulse detonation system comprising a pulse detonation core assembly comprising at least one detonation chamber configured to detonate a fuel mixture, said pulse detonation core assembly being positioned between said fan assembly and said turbine.

7. The turbofan engine of claim 6 further comprising a turbine sub-system, said turbine sub-system comprising said at least one turbine and being positioned between said pulse detonation core assembly and said exhaust portion, and said pulse detonation core assembly being in flow communication with said turbine sub-system.

8. The turbofan engine of claim 7 further comprising a cooling air pump configured to supply cooling air to said turbine sub-system, said cooling air pump being disposed radially inward from said pulse detonation core assembly.

9. The turbofan engine of claim 7 further comprising an ejector/mixer configured to control an amount of high pressure gas exiting said pulse detonation core assembly and flowing to said turbine, said ejector/mixer being disposed upstream from said turbine.

10. The turbofan engine of claim 7, wherein said fan assembly includes a forward fan in flow communication with said turbine.

* * * * *